United States Patent
Nishida et al.

(10) Patent No.: US 8,530,053 B2
(45) Date of Patent: Sep. 10, 2013

(54) HEAT-RESISTANT COMPOSITE MATERIAL

(75) Inventors: Hirofumi Nishida, Hyogo (JP); Norio Hirayama, Koriyama (JP)

(73) Assignees: Nagase Chemtex Corporation, Osaka (JP); Nitto Boseki Co., Ltd., Fukushima (JP)

( * ) Notice: Subject to any disclaimer, the term of this patent is extended or adjusted under 35 U.S.C. 154(b) by 463 days.

(21) Appl. No.: 11/666,600

(22) PCT Filed: Oct. 25, 2005

(86) PCT No.: PCT/JP2005/019553
§ 371 (c)(1),
(2), (4) Date: Dec. 7, 2007

(87) PCT Pub. No.: WO2006/046534
PCT Pub. Date: May 4, 2006

(65) Prior Publication Data
US 2008/0139698 A1 Jun. 12, 2008

(30) Foreign Application Priority Data
Oct. 27, 2004 (JP) .................. 2004-313165

(51) Int. Cl.
B32B 27/26 (2006.01)
B32B 27/04 (2006.01)
B32B 27/38 (2006.01)
C08G 59/22 (2006.01)
C08G 59/32 (2006.01)
C08G 59/38 (2006.01)
C08G 59/68 (2006.01)
C08L 63/00 (2006.01)

(52) U.S. Cl.
USPC .......... 428/413; 428/297.4; 523/455; 523/457

(58) Field of Classification Search
None
See application file for complete search history.

(56) References Cited

U.S. PATENT DOCUMENTS

| 3,849,154 A | * | 11/1974 | Michael et al. | 427/289 |
| 4,607,069 A | * | 8/1986 | Tesch et al. | 523/400 |
| 4,713,137 A | | 12/1987 | Sexton | |
| 4,804,427 A | * | 2/1989 | Paul et al. | 156/181 |
| 5,212,261 A | * | 5/1993 | Stierman | 525/506 |
| 2005/0065295 A1 | * | 3/2005 | Christiansen et al. | 525/523 |

FOREIGN PATENT DOCUMENTS

| EP | 0 712 899 A1 | | 5/1996 |
| EP | 1 209 200 A2 | | 5/2002 |
| EP | 1 454 956 A1 | | 9/2004 |
| JP | 62-070415 A | * | 3/1987 |
| JP | 08-134238 | | 5/1996 |
| JP | 2000273224 A | * | 10/2000 |
| JP | 2002-020459 | | 1/2002 |
| JP | 2004-204186 | | 7/2004 |
| JP | 2004-353141 A | * | 12/2004 |

OTHER PUBLICATIONS

Machine translation of JP 2004-204186 A, provided by the JPO website (no date).*
Machine translation of JP 2004-353141 A, provided by the JPO website (no date).*
Partial human translation of JP 2004-353141 A, provided by the USPTO translations branch (no date).*
Machine translation of JP 2000273224 A, provided by the JPO website (no date).*

* cited by examiner

*Primary Examiner* — Michael J Feely
(74) *Attorney, Agent, or Firm* — Edwards Wildman Palmer LLP

(57) ABSTRACT

A high heat-resistant composite material which comprises a polymerizable composition comprising a bi-functional epoxy compound, a tri- or more-functional epoxy compound and a polymerization initiator, wherein the polymerization initiator comprises a sodium salt or potassium salt of mono- or poly-functional carboxylic acid, and a reinforcing fiber such as a carbon fiber or a glass fiber; and a vehicle member or a construction member comprising the above heat-resistant composite material. Said composite material comprises an epoxy polymer having high heat-resistant physical properties over those of a conventional epoxy polymer as a matrix, and exhibits an extremely high retention factor of storage modulus at high temperature.

14 Claims, 1 Drawing Sheet

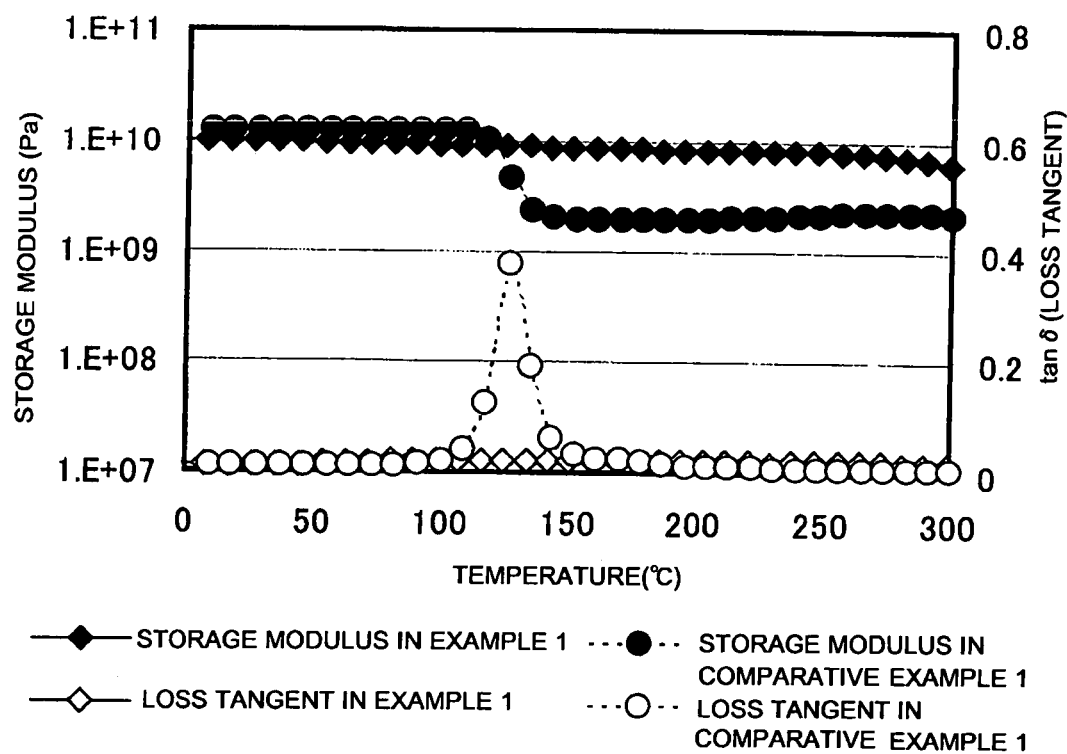

HEAT-RESISTANT COMPOSITE MATERIAL

CROSS-REFERENCE TO PRIOR APPLICATIONS

This application is a §371 national phase filing of international application number PCT/JP2005/019553, which has an international filing date of 25 Oct. 2005, and which claims priority to Japanese Patent Application Serial No. 2004-313165 which has a filing date of 27 Oct. 2004, both of which are incorporated by reference.

FIELD OF THE INVENTION

The present invention relates to a heat-resistant composite material having, as a matrix, an epoxy resin composition using an alkali metal salt of a carboxylic acid as an anionic polymerization initiator, and containing a reinforcing fiber.

BACKGROUND ART

Conventionally, as a light-weight material for construct having heat resistance, fiber-reinforced plastics (hereafter referred to also as FRP) having various heat-resistant resins such as polyimide as a matrix have been developed mainly as a material for aerospace purposes. However, these heat-resistant resins such as polyimide are inferior in the formability and economy to epoxy resins for general purposes. For this reason, it has not been general to apply these heat-resistant resins, for example, to the field of vehicles, construction, and the like other than the materials for aerospace purposes.

Also, heat-resistant FRP using a phenolic resin, in particular a resol-type phenolic resin, is known in the art. However, these are produced by dehydration condensation of a resol-type phenolic resin with an acid catalyst, and are therefore porous to have insufficient strength.

On the other hand, an epoxy resin is excellent in formability and economy, and also has an extremely good adhesion property with carbon fiber, so that the epoxy resin has excellent characteristics as a matrix of FRP. However, conventional epoxy resins do not necessarily have sufficient heat resistance, and it has been difficult to ensure a high heat resistance of, for example, 250° C. or more.

In contrast to this, the present inventors have disclosed an epoxy resin composition made by compounding an ion-containing polymer into an epoxy resin (See, for example, Patent Document 1). In the above-mentioned patent document, an ion-containing polymer is used as a curing agent in an epoxy resin, and a cured product extremely excellent in heat-resisting property can be obtained. Namely, in the case of a polymer of a bi- or more-functional epoxy compound, a high cross-linking density polymer having a high uniformity of cross-linking with no scarcely cross-linked parts can be expected. Such an epoxy polymer may possibly exhibit a performance with physical properties not conventionally known in the art. It can be said that the use of such a polymer meets the demands of the relevant field of the art in which a further higher performance of an epoxy resin is needed in response to the technical innovation of the industrial field.

Patent Document 1: Japanese Patent Application Laid-Open (JP-A) No. 2004-204186

DISCLOSURE OF THE INVENTION

Problems to be Solved by the Invention

In view of the above-described present circumstance, an object of the present invention is to provide a highly heat-resistant fiber-reinforced type composite material having, as a matrix, a highly heat-resistant epoxy polymer conventionally not known.

Means for Solving the Problems

The present inventors have found that, by blending an ion-containing polymer into an epoxy resin, a cured epoxy resin can be obtained without the use of a generally used epoxy resin curing agent such as an aliphatic polyamine, amido-amine, polyamide, aromatic polyamine, acid anhydride, Lewis base, or polymercaptan, and moreover exhibits an extremely excellent heat-resisting property. By making further studies on this finding, the present inventors have found that an alkali metal salt of a carboxylic acid is a good anionic polymerization initiator. The present invention has been completed on the basis of this unexpected findings.

Therefore, the present invention is a heat-resistant composite material comprising a polymerizable composition which comprises a bi- or more-functional epoxy compound and a polymerization initiator, said polymerization initiator comprising an alkali metal salt of a carboxylic acid, and a reinforcing fiber. The alkali metal salt of a carboxylic acid is an alkali metal salt of a monofunctional carboxylic acid or an alkali metal salt of a polyfunctional carboxylic acid.

According to one aspect of the present invention, the alkali metal salt of a polyfunctional carboxylic acid is an alkali metal salt of a polymer containing at least two carboxyl-group-containing repeating units.

According to another aspect of the present invention, the epoxy compound comprises a bifunctional epoxy compound and a tri- or more-functional epoxy compound.

The present invention is also a vehicle member or a construction member made of the heat-resistant composite material.

Effects of the Invention

Owing to the above-described constitution, the present invention provides the following effects.
(1) By allowing a bi- or more-functional epoxy compound to polymerize at a high reaction rate with use of an alkali metal salt of a carboxylic acid, the termination reaction and the chain transfer hardly occur, and a polymer realizing a high polymerization degree of an epoxy compound can be made into a matrix.
(2) The anionic polymerization initiator in the present invention has a relatively low hygroscopicity, so that the matrix for the composite material of the present invention can be worked in the air.
(3) By polymerizing a bi- or more-functional epoxy resin, a composite material containing, as a matrix, a highly heat-resistant resin having a high retention factor of storage modulus even at a high temperature, and having substantially no Tg that can be observed as a local maximum value of the loss tangent can be produced.
(4) By using a bi functional epoxy compound and a tri functional epoxy compound in combination, a composite material containing, as a matrix, a highly heat-resistant resin having an extremely high retention factor of storage modulus can be produced.
(5) The composite material of the present invention has an extremely high storage modulus at high-temperature as a composite material, and shows a high value far exceeding the retention factor of storage modulus at high-temperature in conventional composite materials.

BRIEF DESCRIPTION OF THE DRAWING

FIG. 1 is a chart representing the dynamic visco-elasticity behavior in Example 1 and in the Comparative Example 1.

BEST MODE FOR CARRYING OUT THE INVENTION

The epoxy compound in the present invention is not particularly limited as long as it is a compound having two or more epoxy groups, so that various known epoxy resins can be used. Examples thereof may include mononucleus aromatic epoxy resins having one benzene ring such as catechol diglycidyl ether, resorcin diglycidyl ether, phthalic acid diglycidyl ether (YDC-1312, manufactured by Tohto Kasei Co., Ltd.), 2,5-diisopropylhydroquinone diglycidyl ether, hydroquinone diglycidyl ether, phloroglucinol PEG (manufactured by Nagase ChemteX Corporation); alicyclic epoxy resins such as Celloxide 2021P (manufactured by Daicel Chemical Industries, Ltd.), CY175 (manufactured by Ciba Specialty Chemicals Inc.); bisphenol type epoxy resins such as bis(4-hydroxyphenyl)methane diglycidyl ether, bis(4-hydroxyphenyl)ethane diglycidyl ether, bis(4-hydroxyphenyl)propane diglycidyl ether, and bisphenol S type epoxy resins (EX-251, manufactured by Nagase ChemteX Corporation or the like) as well as oligomer mixtures obtained by partial condensation thereof and nucleus-hydrogenated type epoxy resins thereof; tetramethylbis(4-hydroxyphenyl)methane diglycidyl ether, and tetramethylbis(4-hydroxyphenyl)ether diglycidyl ether; biphenyl type or tetramethylbiphenyl type epoxy resins (YX-4000, manufactured by Japan Epoxy Resins Co., Ltd., or the like) and nucleus-hydrogenated type epoxy resins of these; fluorene type epoxy resins such as bisphenol fluorene type or biscresol fluorene type epoxy resin (BPF diglycidyl ether, manufactured by Nagase ChemteX Corporation), BCF diglycidyl ether (manufactured by Nagase ChemteX Corporation); naphthalene type epoxy resins such as HP-4032D (manufactured by Dainippon Ink and Chemicals Incorporated), EXA-4750 (manufactured by Dainippon Ink and Chemicals Incorporated), and EXA-4700 (manufactured by Dainippon Ink and Chemicals Incorporated); polyfunctional glycidylamines such as ELM-100 (manufactured by Sumitomo Chemical Co., Ltd.), and MY721 (manufactured by Ciba Specialty Chemicals Inc.); dicyclopentadiene type epoxy resins such as ZX-1257 (manufactured by Tohto Kasei Co., Ltd.), HP-7200 (manufactured by Dainippon Ink and Chemicals Incorporated); novolak type epoxy resins such as RE-305 (manufactured by Nippon Kayaku Co., Ltd.), EOCN-4500 (manufactured by Nippon Kayaku Co., Ltd.), and EPPN-501H (manufactured by Nippon Kayaku Co., Ltd.); polyfunctional glycidyl ethers such as Epikote 1032H60 (manufactured by Japan Epoxy Resins Co., Ltd.), Epikote 1031S (manufactured by Japan Epoxy Resins Co., Ltd.), TECHMORE VG3101 (manufactured by Mitsui Chemicals, Inc.); and other epoxy resins, for example, silylated epoxy resins (silylated GY260, manufactured by Nagase ChemteX Corporation, or the like), heterocyclic epoxy resins (CY350, manufactured by Nagase ChemteX Corporation, and triglycidyl isocyanurate or the like), diglycidyl ether of bisphenol A propylene oxide adduct, diglycidyl ether of bisphenol A ethylene oxide adduct, and diallylbisphenol A type epoxy resin, and the like. These may be used either singly or in combination of two or more kinds. Also, a bifunctional epoxy compound and a tri- or more-functional epoxy compound may be used in combination.

As the polymerization initiator in the present invention, an alkali metal salt of a carboxylic acid is used. As the alkali metal salt of the carboxylic acid, it may be either a monofunctional carboxylic acid or a polyfunctional carboxylic acid. Specific examples of the alkali metal salt of the monofunctional carboxylic acid may include alkali metal salts of monofunctional carboxylic acid such as lauric acid, n-caprylic acid, cyclohexanecarboxylic acid, 3-cyclohexylpropionic acid, phenylacetic acid, acetic acid, stearic acid, Versatic acid, and 2-ethylhexanoic acid.

Examples of the alkali metal salt of the polyfunctional carboxylic acid may include alkali metal salts of a polymer containing at least two carboxyl-group-containing repetition units. Examples of the polymer containing at least two carboxyl-group-containing repetition units may include styrene-maleic acid half-ester copolymer, styrene-methacrylic acid copolymer (having a polymerization degree of about 5 to 50000), and carboxylic-acid-terminated butadiene-acrylonitrile-liquid rubber (bifunctional or trifunctional). Also, ion-containing polymers disclosed in Japanese Patent Application Laid-Open (JP-A) No. 2004-204186 can be exemplified, and alkali metal salts of the polymers represented by the following formulas (1) to (3) can be exemplified.

[chemical 1]

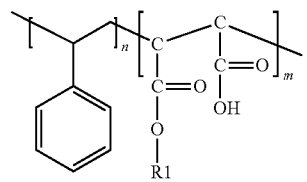
(1)

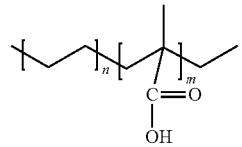
(2)

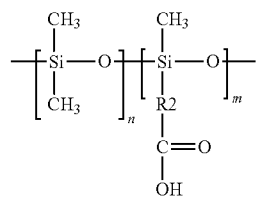
(3)

In the formula, m represents an integer equal to or larger than 2; n represents an integer of zero or equal to or larger than 1; R1 represents hydrogen or a monovalent organic group; and R2 represents a divalent organic group.

As the alkali metal salt of the polyfunctional carboxylic acid, an alkali metal salt of a bi- or more-functional carboxylic acid without having a repetition unit can be also used. Examples of such an alkali metal salt of a bi- or more-functional carboxylic acid without having a repetition unit may include alkali metal salts of a carboxylic acid such as phthalic acid, dodecenylsuccinic acid, dodecanedicarboxylic acid, and carboxylic-acid-terminated butadiene-acrylonitrile liquid rubber (bifunctional or trifunctional), and a carboxylic acid containing at least three carboxyl groups, for example, citric acid, isocitricacid, CTBN1009SP (Carboxy-Terminated Butadiene Acrylonitrile Copolymer, manufactured by Ube Kousan Industries, Ltd.), and the like.

When the compounding amount of the alkali metal salt of the bi- or more-functional carboxylic acid is too much, there is a fear that the carboxylic acid may be coagulated and separated. Therefore, in using this, it is preferable to use it so as to attain the number of functional groups as a whole of 1.5 or less, more preferably a functionality of 1.3 or less, still more preferably a functionality of about 1.2, in these monofunctional carboxylic acid and bi- or more-functional carboxylic acid.

In the present invention, the alkali metal salt is a salt of at least one kind of alkali metal selected from the group consisting of Li, Na, K, Rb, and Cs. Among these, a salt of Na or K is preferable in view of reactivity and economy.

In the present invention, the alkali metal salt of the carboxylic acid can act as a polymerization initiator for polymerizing an epoxy compound. Therefore, there is no need to contain other curing agent components for curing. However, it does not exclude compounding a small amount of other known curing agents within a range that does not impair object of the present invention.

In the present invention, the alkali metal salt of the carboxylic acid is compounded typically in a ratio according to the amount of an anion enabling to react an epoxy group of the epoxy compound. By compounding the alkali metal salt of the carboxylic acid, the curing property of the epoxy resin will be good, and the maximum value of the loss tangent at 300° C. or below will be extremely small, so that the maximum value of the loss tangent at 1 Hz can be 0.1 or less at 300° C. or below, and the local maximum value of the loss tangent at 300° C. or below substantially does not appear or, even if it appears, the peak height thereof is extremely low and can be 0.1 or less. Therefore, a resin composition substantially without having Tg that can be observed as the local maximum value of the loss tangent can be obtained.

In the present invention, it seems that, by compounding an anion for reaction with an epoxy group, self-polymerization of an epoxy ring starts, and an ether bond is formed by anionic polymerization. This reaction seems to proceed until the epoxy groups are consumed. In the present invention, this consumption rate of epoxy groups is high, and the monomer is consumed rapidly to let the polymerization proceed after the reaction starts. Also, the termination reaction and the chain transfer hardly occur, so that a polymer of high polymerization degree grows. As a result of this, in the polymer of a bi- or more-functional epoxy compound, a resin uniformly highly cross-linked with no scarcely cross-linked parts is formed, so that a resin without having Tg is obtained as described above. The amount of reaction of the epoxy group can be measured by a method of measuring the methine peak of the epoxy ring by 1H-NMR, a method of measuring the intensity of 914 $cm^{-2}$ peak (absorption peak of the epoxy group) by IR, or the like.

Regarding the anion amount needed for allowing the epoxy group to react, the initiator is preferably compounded, for example, in a ratio such that the molar number of the anion in the alkali metal salt of the carboxylic acid will be 0.01 or more relative to the molar number of the epoxy groups in the epoxy compound. When the compounding amount is smaller than the aforesaid range, there is a fear that the polymerization degree will be insufficient. The lower limit is more preferably 0.02 or more. On the other hand, the upper limit is not particularly set; however, when the aforesaid molar number of the anion is excessively large relative to the molar number of the epoxy groups in the epoxy compound, there is a fear that the polymerization initiation points will increase, and the polymerization degree will be low. Therefore, in the present invention, a ratio attaining 2.0 is more preferable as the upper limit.

As the reinforcing fiber, a known reinforcing fiber typically used in FRP can be used, so that carbon fiber, glass fiber, polyester fiber, aromatic polyamide fiber, or the like can be used, for example.

The compounding amount of the reinforcing fiber is not particularly limited, and a compounding amount typically used in FRP can be adopted. For example, the amount can be about 10 to 60 vol % in the composite material, more preferably 20 to 50 vol %. When the compounding amount of the reinforcing fiber is less than 20 vol %, the surface of the molded product tends to be uneven, and the warpage or undulation tends to be large. When the compounding amount exceeds 50 vol %, the fiber tends to be non-impregnated with the resin.

The heat-resistant composite material of the present invention can be produced by impregnating the reinforcing fiber with a matrix that can be obtained by a production method having a step of mixing a bi- or more-functional epoxy compound and the alkali metal salt of the carboxylic acid preferably in a ratio to attain an ion amount capable of reaction with the epoxy groups of the epoxy compound. In the mixing step, the epoxy compound and the alkali metal salt of the carboxylic acid may be mixed at room temperature to 100° C.

The mixing can be carried out by a known method and, for example, means well known in the art such as a disperser, a mixer, a kneader, a homogenizer, or a three-roll mill can be used.

Into the heat-resistant composite material of the present invention, various conventionally known inorganic fillers may be further blended within a range that does not deteriorate the effects of the present invention. The kind and the blending amount of an inorganic filler can be suitably selected in accordance with the intended purpose of use and the viscosity of the composition. Examples of the inorganic filler may include fused silica powder, silica glass powder, crystalline silica powder, glass microfiber, talc, alumina powder, calcium silicate powder, calcium carbonate powder, antimony oxide powder, barium sulfate powder, titanium oxide powder, aluminum hydroxide powder, and the like.

Further, the heat-resistant composite material of the present invention can include, for example, various coupling agents, antifoaming agents, stress-reducing agents, flame retardants, rubber particles, pigments, and the like within a range that does not deteriorate the effects of the present invention.

The reason why the composite material of the present invention has an extremely high retention factor of storage modulus even at a high temperature is not sufficiently definite; however, can be considered as follows. Namely, an epoxy resin having an ordinary Tg generally has a retention factor of storage modulus of 10% or less at a high temperature. Therefore, when the temperature becomes high and the storage modulus lowers, the epoxy resin will not have a function of binding the reinforcing fiber when it is made into a composite material. For this reason, it is known that the following formula that infers the static flexural modulus of a composite material at an ordinary temperature can no longer be applied.

$$Ec=k[EfVf+Em(1-Vf)]$$

Here, Ec is the flexural modulus of the composite material; Ef is the flexural modulus of the reinforcing fiber; Em is the flexural modulus of the matrixres in; Vf is the volumetric content of the reinforcing fiber. Also, k is a correction coefficient in consideration of the influence of the form of the fiber, the irregular orientation, the voids, and the like, and typically assumes a value of about 0.5 to 1.0. As described above, at a high temperature close to 300° C., the decrease in the flexural modulus of the matrix resin is intense, and the reinforcing fiber cannot maintain the shape within the composite material. Therefore, with this formula, the storage modulus of the composite material at a high temperature close to 300° C. such as in the present invention cannot be inferred. In other words, this formula is a formula for inferring the static flexural modulus only in the case where the reinforcing fiber is supported and bound by the matrix resin in the composite material. As a result of this, it has conventionally been impossible to infer the storage modulus of a composite material at a high temperature, and it has been extremely difficult to design a composite material at a high temperature.

However, the present inventors have found at this time that, even at a high temperature close to 300° C., the above inference formula holds if the resin has a retention factor of storage modulus of about 30 to 40%. This does not mean that use of a resin having a higher retention factor of storage modulus than conventional resins may be simply used, but it needs a resin rigidity and the close adhesiveness such that the reinforcing fiber can be supported and bound by the matrix resin within the composite material at a high temperature. For this, compatibility between the kind or property of the resin and the kind or property of the reinforcing fiber is extremely important. Therefore, the invention can be achieved only by finding a matrix resin to which the above inference formula can be actually applied. Indeed, it is by combining with the matrix resin in the present invention that the storage modulus of a composite material can be designed at a high temperature. Therefore, even with a matrix resin having a retention factor of storage modulus of at most 30 to 40%, an extremely high retention factor of storage modulus at a high temperature can be exhibited when it is made into a composite material. The meaning of this will be understood, for example, by the following virtual case.

For example, calculations such as the following can be made. Even when the storage modulus of 5 GPa of the matrix resin at an ordinary temperature decreases to be 2 GPa at 300° C., the composite material using a glass fiber having a storage modulus of 74 GPa can be inferred to have a retention factor of 90% or more as in the following formula.

$$Ec=0.5\times[74\times0.4+5\times(1-0.4)]=16.3 \text{ GPa } (25° \text{ C.})$$

$$Ec=0.5\times[74\times0.4+2\times(1-0.4)]=15.4 \text{ GPa } (300° \text{ C.})$$

The heat-resistant composite material of the present invention can be applied to FRp mold, vehicle members (for example, members around an engine exposed to high temperature, wheels, fenders, bodies, and the like), construction members, housing equipment (for example, a counter top of a cooking range), and the like, and in particular can be applied to a member for usage to which it has been conventionally difficult to apply a conventional composite material because of having an insufficient heat resistance. Also, it can be used for various FRP members by making most of the economy and the property of being excellent in strength.

Examples of the method of molding the composite material of the present invention can include a hand lay-up method, a press-molding method, a transfer molding method, an injection-molding method, a panel-molding method, an autoclave molding method, a filament winding molding method, or the like.

Hereafter, the present invention will be described further in detail on the basis of Examples and the Comparative Examples; however, the present invention is not limited to these.

Here, the abbreviations in the following Table are as follows.

AER260: manufactured by Asahi Kasei Epoxy Co., Ltd., bisphenol-A type liquid epoxy resin, epoxy equivalent of 190 g/eq)
EPIKOTE1032H60: manufactured by Japan Epoxy Resins Co., Ltd., trifunctional epoxy resin, epoxy equivalent of 168 g/eq
EPIKOTE828: manufactured by Japan Epoxy Resins Co., Ltd., bifunctional epoxy resin, epoxy equivalent of 190 g/eq
RIKASIDMT-500TZ: manufactured by New Japan Chemical Co., Ltd., methyltetrahydrophthalic anhydride
S-CURE-661: manufactured by Kayaku Akzo Co., Ltd., curing accelerator
CHPK: potassium cyclohexylpropionate
DDK: dipotassium dodecanedicarboxylate
WE181: glass fiber fabric (manufactured by Nitto Boseki Co., Ltd.)

EXAMPLE 1, COMPARATIVE EXAMPLE 1

Fabrication of Composite Material

Among the raw materials for use shown in Table 1, the raw materials other than the glass fiber fabric WF181 were mixed at parts by weight described in Table 1 to obtain a mixture. Here, the obtained mixture did not provoke a polymerization reaction at the time of the preparation of the mixture or in a state of being stored at room temperature.

Subsequently, with use of this mixture as a matrix resin, the glass fiber fabric WF181 (manufactured by Nitto Boseki Co., Ltd.) was used at vol % described in Table 1 for a reinforcing material, to fabricate a glass fiber reinforced plastic (GFRP) Specifically, the liquid mixture was preheated to 60° C., and a predetermined number of sheets (6 Ply) of each reinforcing fiber fabric were impregnated and laminated by the hand lay-up method. Thereafter, a spacer having a set thickness was prepared, and the air bubbles between the layers were extruded together with the liquid mixture, so as to prepare a prepreg. Then, with use of a mold having a flat plate shape, heated press-molding was carried out at a molding pressure of 1.0 MPa under a curing condition of 120° C.×2 hours+180° C.×4 hours.

Dynamic Viscoelasticity Measurement of Composite Material

In order to evaluate the heat resistance of the obtained composite material, a dynamic viscoelasticity measurement was carried out. By the following method, the storage modulus and the loss tangent (tan δ) were determined.

Method of Measurement

With use of a viscoelasticity measuring apparatus DMS6100 manufactured by Seiko Instruments Inc., a sinusoidal wave of 1 Hz was applied in a dual cantilever mode, and the measurement was carried out at a temperature raising rate of 2° C./min within a temperature range of 0 to 300° C. The result is shown in FIG. 1.

Also, from the values of storage modulus at 25° C. and storage modulus at 300° C., the retention factor of storage modulus was determined. The retention factor of storage modulus is according to the following formula.

Retention factor of storage modulus=(value of storage modulus at 300° C.)/(value of storage modulus at 25° C.)×100 (%)

Three-Point Bending Test

In order to confirm the static strength and flexural modulus of the obtained composite material, a three-point bending test was carried out according to JIS K 7198 (measurement was carried out with use of an Instron universal testing machine (manufactured by Instron Co., Ltd.) with a cross-head rate of 5.3 mm/min). The test piece was set to have a shape with a height of 2 mm, a width of 15 mm, and a length of 80 mm, and the bending span was set to be 60 mm. The measurement was carried out at 25° C., 170° C., 200° C., and 230° C. The result is shown in Table 1.

TABLE 1

| Compounding | | Example 1 | Comparative Example 1 |
|---|---|---|---|
| AER260(wt/%) | | 50 | — |
| EPIKOTE1032H60(wt/%) | | 50 | — |
| EPIKOTE828(wt/%) | | — | 100 |
| Rikasid MT-500TX(wt/%) | | — | 80 |
| S-CURE-661(wt/%) | | — | 1 |
| CHPK(wt/%) | | 20 | — |
| DDK(wt/%) | | 4 | — |
| WE181(vol/%) | | 33.4 | 34.6 |
| Molding (curing) condition | | 120° C./2 h ± 180° C./4 h | 160° C./3 h |
| Flexural strength (MPa) | 25° C. | 229 | 232 |
| | 170° C. | 166 | 73 |
| | 200° C. | 151 | Too low to be measured |
| | 230° C. | 133 | Too low to be measured |
| Retention factor of storage modulus | | 81 | 17 |

From Example 1, it will be understood that, in terms of the flexural modulus and the strength, the obtained composite material at an ordinary temperature have values equivalent to those of an FRP that uses an ordinary heat-curing epoxy resin.

Further, from FIG. 1, it has been found that the high-temperature retention factor of the storage modulus up to 300° C. was as high as 81%. The reason why the composite material of the present invention shows an extremely high retention factor of storage modulus even at a high temperature such as 300° C. in this manner unlike the conventional composite materials seems to be the following:
(1) The resin used in the present invention has a retention factor of storage modulus of 30 to 40% at 300° C.; (2) the compounded reinforcing fiber has an extremely high storage modulus, and the storage modulus does not decrease up to 300° C.; and (3) the resin used in the present invention has an excellent adhesiveness to glass fiber or carbon fiber.

Also, it has been confirmed that no peak of tanδ appears and no Tg is present in the composite material of Example 1. From the fact that the storage modulus maintains an almost constant value up to 300° C., it is clear that the composite material of Example 1 has a high heat-resisting property.

Industrial Applicability

The heat-resistant composite material of the present invention can obtain a high heat-resisting property by using an epoxy compound polymer having a high heat-resisting property conventionally not known as a matrix, can be applied to a region in which the use has conventionally been difficult, for example, to a member for use in such as an engine room and, moreover, is excellent in the formability, the economy, and the strength, so that it can provide a highly heat-resistant FRP capable of developing a novel usage, thereby being extremely advantageous for industry.

The invention claimed is:

1. A heat-resistant composite material having, as a matrix, a cured epoxy resin, said composite material produced by: impregnating a reinforcing fiber with an anionic polymerizable epoxy composition; and anionically polymerizing the anionic polymerizable epoxy composition to form the cured epoxy resin;
   wherein the anionic polymerizable epoxy composition consists of an epoxy resin component and an anionic polymerization initiator; said epoxy resin component consisting of at least one epoxy compound having two epoxy groups per molecule, at least one epoxy compound having three or more epoxy groups per molecule or a combination thereof; said anionic polymerization initiator consisting of at least one alkali metal salt of a monofunctional carboxylic acid or a combination of at least one alkali metal salt of a monofunctional carboxylic acid and at least one alkali metal salt of a polyfunctional carboxylic acid without having a repeating unit, wherein the anionic polymerization initiator, as a whole, has a salted carboxyl functionality of less than or equal to 1.5 salted carboxyl groups per molecule;
   wherein said reinforcing fiber is at least one kind selected from the group consisting of carbon fiber and glass fiber; and
   wherein the cured epoxy resin exhibits a maximum loss tangent value at 1 Hz of 0.1 or less at 300° C. or below and a local maximum loss tangent value of 0.1 or less at 300° C. or below.

2. The heat-resistant composite material according to claim 1, wherein the anionic polymerization initiator, as a whole, has a salted carboxyl functionality of less than or equal to 1.3 salted carboxyl groups per molecule.

3. The heat-resistant composite material according to claim 2, wherein the alkali metal of the anionic polymerization initiator is Na or K.

4. The heat-resistant composite material according to claim 2, wherein the epoxy resin component consists of at least one epoxy compound having two epoxy groups per molecule and at least one epoxy compound having three or more epoxy groups per molecule.

5. The heat-resistant composite material according to claim 1, wherein the alkali metal of the anionic polymerization initiator is Na or K.

6. The heat-resistant composite material according to claim 1, wherein the epoxy resin component consists of at least one epoxy compound having two epoxy groups per molecule and at least one epoxy compound having three or more epoxy groups per molecule.

7. The heat-resistant composite material according to claim 1, wherein the reinforcing fiber occupies 20 to 60 vol % of the composite material.

8. The heat-resistant composite material according to claim 1, wherein the reinforcing fiber is a fabric.

9. A heat-resistant vehicle member comprising the heat-resistant composite material according to claim 1.

10. A heat-resistant construction member comprising the heat-resistant composite material according to claim 1.

11. The construction member according to claim 10, wherein the epoxy resin component of the heat-resistant composite material consists of at least one epoxy compound having two epoxy groups per molecule and at least one epoxy compound having three or more epoxy groups per molecule.

12. The heat-resistant composite material according to claim 1, wherein the anionic polymerization initiator is provided in an amount yielding 0.01-2.0 salted carboxyl groups per epoxy group of the epoxy resin component.

13. The heat-resistant composite material according to claim 1, wherein the at least one alkali metal salt of a monofunctional carboxylic acid is selected from the group consisting of sodium salt of lauric acid, sodium salt of n-caprylic acid, sodium salt of cyclohexanecarboxylic acid, sodium salt of 3-cyclohexylpropionic acid, sodium salt of phenylacetic acid, sodium salt of stearic acid, sodium salt of 2-ethylhexanoic acid, potassium salt of lauric acid, potassium salt of n-caprylic acid, potassium salt of cyclohexanecarboxylic acid, potassium salt of 3-cyclohexylpropionic acid, potassium salt of phenylacetic acid, potassium salt of acetic acid, potassium salt of stearic acid, and potassium salt of 2-ethylhexanoic acid; and the at least one alkali metal salt of a polyfunctional carboxylic acid without having a repeating unit is selected from the group consisting of dipotassium salt of phthalic acid, dipotassium salt of dodecenylsuccinic acid, and dipotassium salt of dodecanedicarboxylic acid.

14. A heat-resistant composite material having, as a matrix, a cured epoxy resin, said composite material produced by: impregnating a reinforcing fiber with an anionic polymerizable epoxy composition; and anionically polymerizing the anionic polymerizable epoxy composition to form the cured epoxy resin;

wherein the anionic polymerizable epoxy composition consists of an epoxy resin component, an anionic polymerization inhibitor, and at least one additive selected from the group consisting of an inorganic filler, an antifoaming agent, a flame retardant, and a pigment; said epoxy resin component consisting of at least one epoxy compound having two epoxy groups per molecule, at least one epoxy compound having three or more epoxy groups per molecule or a combination thereof; said anionic polymerization initiator consisting of at least one Na or K salt of a monofunctional carboxylic acid selected from the group consisting of sodium salt of lauric acid, sodium salt of n-caprylic acid, sodium salt of cyclohexanecarboxylic acid, sodium salt of 3-cyclohexylpropionic acid, sodium salt of phenylacetic acid, sodium salt of stearic acid, sodium salt of 2-ethylhexanoic acid, potassium salt of lauric acid, potassium salt of n-caprylic acid, potassium salt of cyclohexanecarboxylic acid, potassium salt of 3-cyclohexylpropionic acid, potassium salt of phenylacetic acid, potassium salt of acetic acid, potassium salt of stearic acid, and potassium salt of 2-ethylhexanoic acid;

wherein said reinforcing fiber is at least one kind selected from the group consisting of carbon fiber and glass fiber; and wherein the cured epoxy resin exhibits a maximum loss tangent value at 1 Hz of 0.1 or less at 300° C. or below and a local maximum loss tangent value of 0.1 or less at 300° C. or below.

* * * * *